United States Patent
Gomadam et al.

(10) Patent No.: US 9,220,087 B1
(45) Date of Patent: Dec. 22, 2015

(54) DYNAMIC POINT SELECTION WITH COMBINED PUCCH/PUSCH FEEDBACK

(75) Inventors: Krishna Srikanth Gomadam, Santa Clara, CA (US); Yan Zhang, Palo Alto, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 80 days.

(21) Appl. No.: 13/610,904

(22) Filed: Sep. 12, 2012

Related U.S. Application Data

(60) Provisional application No. 61/568,588, filed on Dec. 8, 2011.

(51) Int. Cl.
*H04W 72/04* (2009.01)
*H04W 88/08* (2009.01)

(52) U.S. Cl.
CPC .............. *H04W 72/04* (2013.01); *H04W 88/08* (2013.01)

(58) Field of Classification Search
CPC ...... H04W 76/00; H04W 88/08; H04W 72/04
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |
| 5,349,567 A | 9/1994 | Reed | |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 8,325,844 B2 | 12/2012 | Walton et al. | |
| 8,515,435 B2 * | 8/2013 | Krasny et al. | 455/450 |
| 8,559,879 B2 | 10/2013 | Bhushan et al. | |
| 8,565,808 B2 | 10/2013 | Hosono et al. | |
| 8,611,448 B2 * | 12/2013 | Erell et al. | 375/267 |

(Continued)

FOREIGN PATENT DOCUMENTS

| | | |
|---|---|---|
| CN | 101764681 A | 6/2010 |
| EP | 2182754 A1 | 5/2010 |

(Continued)

OTHER PUBLICATIONS

U.S. Appl. No. 13/543,835 Office Action dated Nov. 22, 2013.

(Continued)

*Primary Examiner* — Hassan Phillips
*Assistant Examiner* — Prenell Jones

(57) ABSTRACT

A method includes receiving in a mobile communication terminal signals from multiple cells that coordinate transmission of the signals with one another in a Cooperative Multipoint (CoMP) scheme. A respective channel feedback for each of the multiple cells, and a single additional rich channel feedback having a higher information content than the channel feedback computed for the multiple cells, are calculated in the terminal based on the received signals. The channel feedback for the multiple cells is transmitted on a periodic uplink control channel, and the single rich channel feedback is transmitted on an a-periodic uplink channel.

12 Claims, 2 Drawing Sheets

(56) References Cited

U.S. PATENT DOCUMENTS

| | | |
|---|---|---|
| 8,694,017 B2 | 4/2014 | Bhushan |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0201407 A1 | 8/2007 | Borran et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0069031 A1 | 3/2008 | Zhang et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0245195 A1 | 10/2009 | Bhattad et al. |
| 2009/0247084 A1 | 10/2009 | Palanki |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0009634 A1 | 1/2010 | Budianu et al. |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1* | 5/2010 | Farajidana et al. ............ 455/507 |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1* | 10/2010 | Liu et al. ......................... 370/252 |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2010/0309861 A1 | 12/2010 | Gorokhov et al. |
| 2011/0013710 A1 | 1/2011 | Xiao |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0034192 A1 | 2/2011 | Lim et al. |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0086663 A1 | 4/2011 | Gorokhov et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1* | 6/2011 | Pelletier et al. ................ 370/252 |
| 2011/0150052 A1 | 6/2011 | Erell et al. |
| 2011/0158190 A1* | 6/2011 | Kuwahara et al. ............ 370/329 |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0176439 A1* | 7/2011 | Mondal et al. ................. 370/252 |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0199986 A1 | 8/2011 | Fong et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250885 A1 | 10/2011 | Zarri et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0002743 A1 | 1/2012 | Cavalcante et al. |
| 2012/0003926 A1* | 1/2012 | Coldrey et al. .................... 455/9 |
| 2012/0008556 A1* | 1/2012 | Noh et al. ....................... 370/328 |
| 2012/0020433 A1 | 1/2012 | Bhattad et al. |
| 2012/0028628 A1* | 2/2012 | Frenger et al. ............... 455/422.1 |

(56) References Cited

U.S. PATENT DOCUMENTS

| | | | |
|---|---|---|---|
| 2012/0033592 A1 | 2/2012 | Kim et al. | |
| 2012/0033630 A1 | 2/2012 | Chung et al. | |
| 2012/0034927 A1* | 2/2012 | Papasakellariou et al. | 455/450 |
| 2012/0039369 A1 | 2/2012 | Choi et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0076028 A1 | 3/2012 | Ko et al. | |
| 2012/0076038 A1* | 3/2012 | Shan et al. | 370/252 |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0188976 A1* | 7/2012 | Kim et al. | 370/329 |
| 2012/0213261 A1 | 8/2012 | Sayana et al. | |
| 2012/0219042 A1 | 8/2012 | Onggosanusi et al. | |
| 2012/0219083 A1 | 8/2012 | Tong et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281556 A1 | 11/2012 | Sayana et al. | |
| 2012/0281620 A1 | 11/2012 | Sampath et al. | |
| 2012/0287799 A1 | 11/2012 | Chen et al. | |
| 2012/0329502 A1* | 12/2012 | Frederiksen et al. | 455/509 |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0077595 A1* | 3/2013 | Aiba et al. | 370/329 |
| 2013/0083681 A1* | 4/2013 | Ebrahimi Tazeh Mahalleh et al. | 370/252 |
| 2013/0088978 A1 | 4/2013 | Mondal et al. | |
| 2013/0107916 A1 | 5/2013 | Liu et al. | |
| 2013/0114427 A1* | 5/2013 | Maattanen et al. | 370/252 |
| 2013/0114428 A1* | 5/2013 | Koivisto et al. | 370/252 |
| 2013/0114431 A1* | 5/2013 | Koivisto | 370/252 |
| 2013/0122953 A1* | 5/2013 | Zhang et al. | 455/517 |
| 2013/0128847 A1* | 5/2013 | Wang et al. | 370/329 |
| 2013/0176991 A1 | 7/2013 | Yi | |
| 2013/0182786 A1 | 7/2013 | Frenne et al. | |
| 2013/0208678 A1 | 8/2013 | Zhang | |
| 2013/0250885 A1 | 9/2013 | Davydov et al. | |
| 2013/0272221 A1* | 10/2013 | Hoehne et al. | 370/329 |
| 2013/0322393 A1 | 12/2013 | Kishiyama | |
| 2013/0336214 A1 | 12/2013 | Sayana et al. | |
| 2014/0029568 A1* | 1/2014 | Wang et al. | 370/330 |
| 2014/0029586 A1* | 1/2014 | Loehr et al. | 370/336 |
| 2014/0051357 A1* | 2/2014 | Steer et al. | 455/41.2 |
| 2014/0056156 A1 | 2/2014 | Jongren | |

FOREIGN PATENT DOCUMENTS

| | | |
|---|---|---|
| JP | 2008236222 A | 2/2008 |
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No 12/965,878 Notice of Allowance dated Feb. 10, 2014.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/433,293, filed Mar. 29, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
U.S. Appl. No. 61/558,405, filed Nov. 10, 2011.
U.S. Appl. No. 61/556,752, filed Nov. 7, 2011.
U.S. Appl. No. 61/585,556, filed Jan. 11, 2012.
Alcatel-Lucent et al., "Way Forward on Enhancement for Rel.10 DL MIMO", 3GPP TSG RAN WG1 62, Madrid, Spain, Aug. 23- 27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
JP Patent Application # 2011-551560 Office Action dated Oct. 29, 2013.
JP Patent Application # 2012-506601 Office Action dated Oct. 22, 2013.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
U.S. Appl. No. 12/965,878 Office Action dated Oct. 24, 2013.
U.S. Appl. No. 13/052,075 Notice of Allowance dated Nov. 8, 2013.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DOCOMO, 3GPP TSG RAN WG1, "Views on Scalable CSI Feedback for DL CoMP in LTE-Advanced" , Meeting #58bis, R1-094243, pp. 1-5, Oct. 12-16, 2009.
NTT DOCOMO, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 13/433,293 Office Action dated Jun. 24, 2014.
U.S. Appl. No. 13/672,727 Office Action dated Sep. 19, 2014.

(56) References Cited

OTHER PUBLICATIONS

European Application # 12765629 Search Report dated Aug. 5, 2014.
U.S. Appl. No. 13/346,737 Office Action dated Dec. 24, 2014.
U.S. Appl. No. 13/862,422 Office Action dated Feb. 12, 2015.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
QUALCOMM Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSSG RAN WG1 Meeting #55-bis, Ljubljana, Slovenia, Jan. 12 -16, 2009 (R1-090235).
QUALCOMM Europe, Notion of Anchor Carrier in LTE-A', 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.

(56) References Cited

OTHER PUBLICATIONS

Texas Instruments, "Higher CSI feedback accuracy for 4/8Tx Rel.10 DL MIMO", 3GPP TSG RAN WG1 62, Madrid, Spain, Aug. 23-27, 2010.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DOCOMO Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective Sir Mapping Validation, EESM Simulation Results for System-Level Performance Evaluations, and Text Proposal for Section A4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Preceding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Re1.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI" 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.
NTT DOCOMO, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.

(56) References Cited

OTHER PUBLICATIONS

Mondal et al., "Rank-Independent Codebook Design from a Quaternary Alphabet", Proceedings of 41st Asilomar Conference on Signals, Systems and Computers (ACSSC), pp. 297-301, Nov. 7, 2007.

JP Patent Application # 2011-544111 Official Action dated Nov. 6, 2012,

U.S. Appl. No. 14/697,673 Office Action dated Aug. 12, 2015.

U.S. Appl. No. 13/888,385 Office Action dated Oct. 19, 2015.

Liu et al., "Low Complexity MMSE Vector Precoding Using Lattice Reduction for MIMO Systems", IEEE Conference on Communications (ICC'07), pp. 2598-2603, Jun. 24-28, 2007.

\* cited by examiner

DYNAMIC POINT SELECTION WITH COMBINED PUCCH/PUSCH FEEDBACK

CROSS-REFERENCE TO RELATED APPLICATIONS

This application claims the benefit of U.S. Provisional Patent Application 61/568,588, filed Dec. 8, 2011, whose disclosure is incorporated herein by reference.

FIELD OF THE DISCLOSURE

The present invention relates generally to wireless communication, and particularly to methods and systems for providing channel feedback in wireless communication systems.

BACKGROUND

In some Multiple-Input Multiple-Output (MIMO) communication systems, multiple cells use Cooperative Multipoint (CoMP) transmission schemes for coordinating downlink MIMO transmissions to User Equipment (UEs). Third Generation Partnership Project (3GPP) Long Term Evolution—Advanced (LTE-A) systems, for example, use or contemplate the use of multiple CoMP modes such as Dynamic Point Selection (DPS), Dynamic Point Blanking (DPB), Cooperative beamforming (CB) and Joint Processing (JP).

CoMP modes used in LTE-A are specified, for example, in "$3^{rd}$ Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference.

When using CoMP, the cooperating cells typically configure their transmissions based on channel feedback provided by the UEs.

The description above is presented as a general overview of related art in this field and should not be construed as an admission that any of the information it contains constitutes prior art against the present patent application.

SUMMARY

An embodiment that is described herein provides a method in a mobile communication terminal. The method includes receiving in the terminal signals from multiple cells that coordinate transmission of the signals with one another in a Cooperative Multipoint (CoMP) scheme. A respective channel feedback for each of the multiple cells, and a single rich channel feedback, having a higher information content than the channel feedback computed for the multiple cells, are calculated in the terminal based on the received signals. The channel feedback for the multiple cells is transmitted on a periodic uplink control channel, and the single rich channel feedback is transmitted on an a-periodic uplink channel.

In some embodiments, receiving the signals includes receiving Dynamic Point Selection (DPS) signals in which the transmission alternates among the cells such that only a currently-selected cell transmits at any given time, and calculating the rich channel feedback includes computing the channel feedback for the currently-selected cell. In an embodiment, receiving the DPS signals includes receiving the signals in which blanking of interfering cells alternates among the cells, and calculating the rich channel feedback includes computing the channel feedback for the currently-selected cell assuming no interference from other cells.

In another embodiment, receiving the signals includes receiving Coordinated Beamforming (CB) signals in which only a single cell transmits to the terminal while attenuating the transmission of one or more interfering cells, and calculating the rich channel feedback includes computing the channel feedback for the single cell assuming no interference from other cells. In yet another embodiment, receiving the signals includes receiving Joint Processing (JP) signals in which the multiple cells transmit simultaneously to the terminal, and calculating the rich channel feedback includes computing a joint channel feedback for a composite channel from the multiple cells.

In a disclosed embodiment, transmitting the channel feedback on the periodic uplink control channel includes sending the channel feedback on a Physical Uplink Control Channel (PUCCH), and transmitting the rich channel feedback on the a-periodic uplink channel includes sending the rich channel feedback on a Physical Uplink Shared Channel (PUSCH). in an embodiment, calculating the rich channel feedback includes assessing in the terminal a mode of cooperation used by the multiple cells to transmit the signals, and computing the rich channel feedback in accordance with the assessed mode of cooperation.

There is additionally provided, in accordance with an embodiment that is described herein, apparatus including a receiver, processing circuitry and a transmitter. The receiver is configured to receive signals from multiple cells that coordinate transmission of the signals with one another in a Cooperative Multipoint (CoMP) scheme. The processing circuitry is configured to calculate, based on the received signals, a respective channel feedback for each of the multiple cells, and a single additional rich channel feedback having a higher information content than the channel feedback computed for the multiple cells. The transmitter is configured to transmit the channel feedback for the multiple cells on a periodic uplink control channel, and to transmit the single rich channel feedback on an a-periodic uplink channel.

In some embodiments, a mobile communication terminal includes the disclosed apparatus. In some embodiments, a chipset for processing signals in a mobile communication terminal includes the disclosed apparatus.

There is also provided, in accordance with an embodiment that is described herein, a method including receiving from a mobile communication terminal channel feedback, on a periodic uplink control channel, for multiple cells that coordinate transmission to the terminal in a Cooperative Multipoint (CoMP) scheme. A single additional rich channel feedback, having a higher information content than the channel feedback computed for the multiple cells, is received from the terminal on an a-periodic uplink channel. The transmission of the multiple cells to the terminal is configured based on the channel feedback and the single rich channel feedback.

In some embodiments, configuring the transmission includes selecting a mode of cooperation among the cells based on the channel feedback, and configuring the transmission in the selected mode of cooperation based on the single rich feedback.

There is further provided, in accordance with an embodiment that is described herein, a wireless communication network system including multiple cells and a central scheduler. The multiple cells are configured to coordinate transmission to a mobile communication terminal in a Cooperative Multipoint (CoMP) scheme. The central scheduler is configured to receive from the mobile communication terminal via the cells channel feedback for the multiple cells and to receive via the cells a single additional rich channel feedback having a higher information content than the channel feedback computed for the multiple cells, and to configure the transmission of the multiple cells to the terminal based on the channel feedback and the single rich channel feedback.

The present disclosure will be more fully understood from the following detailed description of the embodiments thereof, taken together with the drawings in which:

DETAILED DESCRIPTION OF EMBODIMENTS

Figure 1:
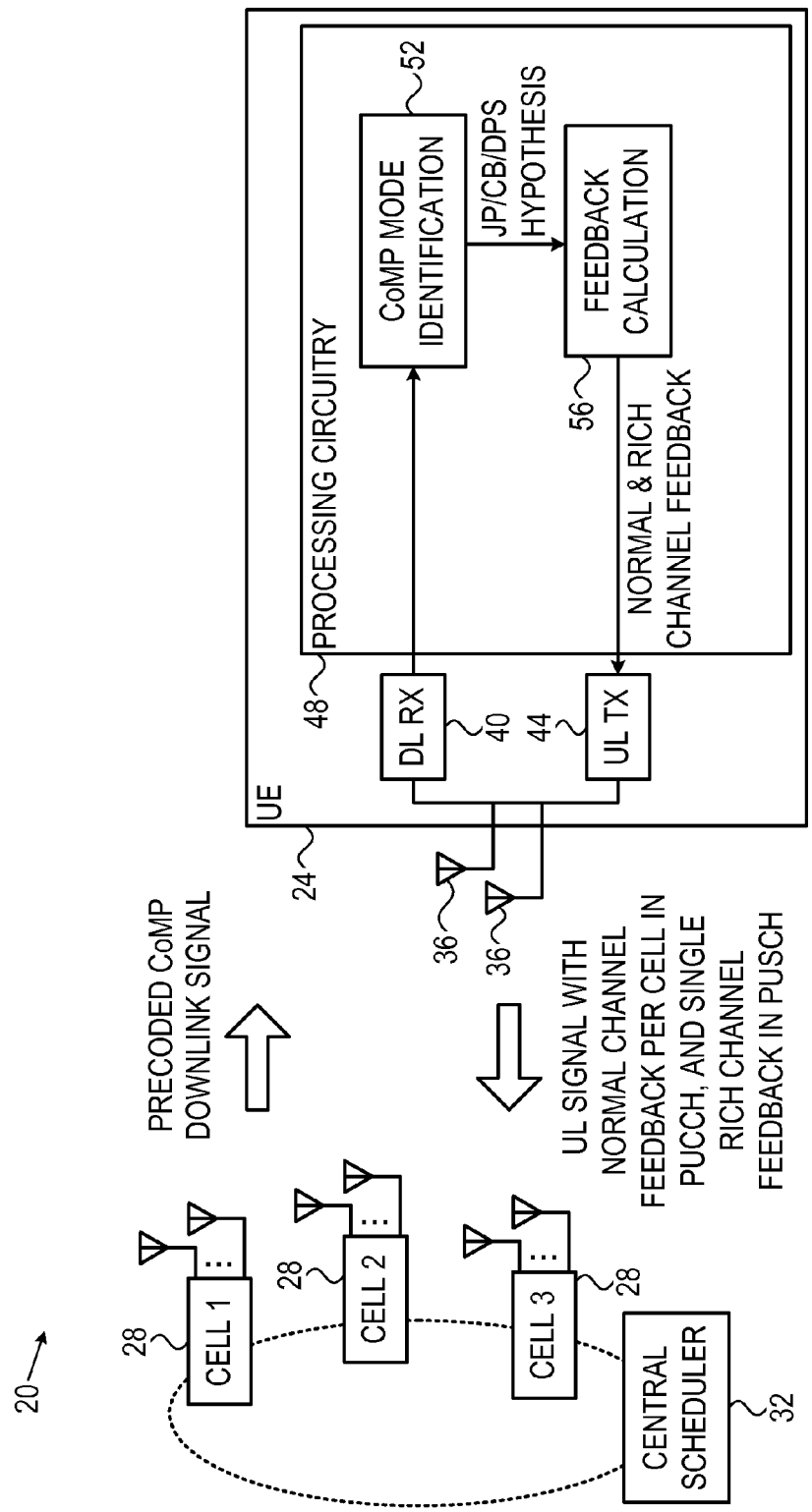
FIG. 1 is a block diagram that schematically illustrates a MIMO communication system that uses CoMP, in accordance with an embodiment that is described herein.

Embodiments that are described herein provide improved methods and systems for providing channel feedback in Multiple-Input Multiple-Output (MIMO) communication systems that use Cooperative Multipoint (CoMP) transmission.

In some embodiments, a mobile communication terminal receives downlink (DL) MIMO signals from multiple cells that coordinate their transmission using CoMP. In various embodiments, the cells cooperate using different CoMP modes, and possibly alternate from one mode to another. An LTE-A system, for example, uses CoMP modes such as Dynamic Point Selection (DPS), Dynamic Point Blanking (DPB), Cooperative beamforming (CB) and Joint Processing (JP). JP is also sometimes referred to as Joint Transmission (JT).

When using JP, multiple cells transmit the same data jointly to a given terminal, so as to effectively produce a large-baseline MIMO transmission from the transmit antennas of the multiple cells. When using CB, a single cell transmits using beamforming to a given terminal in a given time-frequency resource, while attenuating transmission beams that are expected to cause interference. In DPS, a single cell is selected to transmit to a given terminal in a given time-frequency resource, but the cell selection is rapid and performed on a frame-by-frame basis. In DPB, interfering transmission beams are blanked on a frame-by-frame basis, usually in conjunction with DPS.

Typically, the mobile communication terminals receive the CoMP signals from the multiple cells, and use the received signals to compute channel feedback. The terminals transmit the channel feedback to the cells, and the cells configure subsequent transmissions to the terminals based on the feedback.

In some disclosed embodiments, a mobile communication terminal computes two types of channel feedback, referred to as normal channel feedback and rich channel feedback. The terminal computes the normal channel feedback separately for each of the cells. In addition, the terminal computes a single additional rich channel feedback having higher information content than the normal channel feedback.

Aside from the difference in information content, the rich channel feedback differs from the normal channel feedback in the way it is computed and in the way it is fed back to the cells. In some embodiments, the rich channel feedback computation depends on the CoMP mode being used by the cells, or at least on the terminal's hypothesis regarding the CoMP mode being used.

For example, for DPS, the terminal computes the rich channel feedback for the currently-selected cell while considering interference from other cells. For DPS combined with DPB, as well as for CB, the terminal computes the rich channel feedback for the currently-selected cell assuming no interference from other cells. For JP, the rich channel feedback is computed for the composite MIMO communication channel from the set of cooperating cells.

In some embodiments, the terminal transmits the normal channel feedback on a periodic uplink (UL) control channel such as a Physical Uplink Control Channel (PUCCH), and the rich channel feedback in an a-periodic channel such as a Physical Uplink Shared Channel (PUSCH).

The feedback mechanisms described herein are well suited for the typical use of the feedback: Typically, the system (e.g., the cooperating cells or a central scheduler) use the normal channel feedback to select the CoMP mode and/or to select the cell or cells that will transmit to the terminal. For these purposes, relatively coarse channel feedback is typically sufficient. The rich channel feedback, on the other hand, is typically used for configuring the transmission from the selected cell or cells, e.g., for calculating precoding (beamforming) vectors. For this purpose, fine and accurate channel feedback is important.

The disclosed feedback mechanisms are highly efficient in terms of signaling overhead, and provide a unified feedback format that can be used in any CoMP mode, including in systems that alternate between CoMP modes.

FIG. 1 is a block diagram that schematically illustrates a Cooperative Multipoint (CoMP) communication system 20 that uses Multi-User Multiple-Input Multiple-Output (MU-MIMO) transmission, in accordance with an embodiment that is described herein. In the present example, system 20 operates in accordance with Third Generation Partnership Project (3GPP) Long Term Evolution—Advanced (LTE-A) specifications. In alternative embodiments, system 20 may operate in accordance with any other suitable communication protocol in which cells coordinate transmission with one another, such as, for example, WiMAX.

In the embodiment of FIG. 1, system 20 comprises a mobile communication terminal 24 (referred to in LTE-A terminology as User Equipment—UE) and three cells 28 (base stations) denoted CELL1, CELL2 and CELL3. The terms cell and base station are used interchangeably herein. The choice of a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. A group of cells that cooperate in this manner, such as CELL1, CELL2 and CELL3, is referred to as a cooperating set. In various embodiments, cells 28 may use CoMP modes such as DPS, DPB, JP, CB, and possibly alternate between different modes over time.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions. In some embodiments the central scheduler also selects the appropriate CoMP mode, and the cell or cells in the set that will transmit to a UE.

Central scheduler 32 typically selects the CoMP mode, the transmitting cell or cells, and/or the precoding vectors, based on channel feedback that is received from the UEs. In some embodiments, the UEs calculate and report two types of channel feedback—A normal channel feedback and a rich channel feedback. The feedback calculation and reporting mechanisms are explained in detail further below.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the received signals. Among other tasks, processing circuitry 48 identifies the CoMP mode used by cells 28, and calculates the normal and rich channel feedback in accordance with the identified CoMP mode. Processing circuitry 48 provides the normal and rich channel feedback to uplink transmitter 44, which transmits the feedback to cells 28.

In the present embodiment, processing circuitry 48 comprises a CoMP mode identification module 52, which uses the received downlink signals to deduce the CoMP mode used by cells 28. The output of module 52 is a hypothesis as to the CoMP mode being used (e.g., JP, CB or DPS). A feedback calculation module 56 calculates the normal and rich channel feedback in accordance with the hypothesized CoMP mode.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, certain elements of UE 24 are implemented in software, or using a combination of hardware and software elements.

In some embodiments, certain UE elements, such as certain elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

As explained above, cells 28 cooperate with one another using a certain CoMP mode, e.g., DPS, DPB, CB or JP. When using JP, for example, cells 28 transmit the same data jointly to UE 24 over a composite MIMO channel from the overall set of cell transmit antennas. When using CB, a single selected cell transmits to UE 24 in a given time-frequency resource, while transmission beams that are expected to cause interference are attenuated. In DPS, a single cell is selected to transmit to UE 24 in a given time-frequency resource, but the cell selection is rapid and performed on a frame-by-frame basis. In DPB, interfering transmission beams are blanked on a frame-by-frame basis, usually in conjunction with DPS. In some embodiments cells 28 alternate between two or more of the CoMP modes.

(The description herein refers to cells as the basic transmission elements that cooperate with one another in CoMP. In various CoMP schemes, the basic transmission elements are also referred to as transmission points or as Channel State Information Reference Signals (CSI-RS) resource. The terms cells, base stations, transmission points and CSI-RS resource are used interchangeably herein.)

The selection of the CoMP mode, the selection of the cell or cells that will transmit to UE 24, and the scheduling of transmissions are typically performed by central scheduler 32. These decisions are made based on channel feedback that is computed by the UEs and fed back to the cells.

In some embodiments, system 20 uses a feedback scheme that comprises two types of channel feedback—normal channel feedback and rich channel feedback. In these embodiments, both types of channel feedback are computed by feedback calculation module 56 in processing circuitry 48 of UE 24. The normal channel feedback is computed separately for each of cells 32. In addition, module 56 computes a single additional rich channel feedback having higher information content than the normal channel feedback. The cell or cells for which the rich channel feedback is computed varies depending on the CoMP mode, as explained below.

The computation of the rich channel feedback depends on the CoMP mode being used by cells 32 for transmitting to UE 24. In an embodiment, CoMP mode identification module 52 estimates or receives information regarding the current CoMP mode, and provides a hypothesis regarding the current CoMP mode to feedback calculation module 56. Module 56 calculates the rich channel feedback (for one or more of the cells, as detailed below) based on the CoMP mode hypothesis. In some embodiments, module 52 deduces the CoMP mode hypothesis from the received downlink signals. In alternative embodiments, module 52 receives explicit signaling from cells 28, which indicates the current CoMP mode.

Typically, the transmission of each cell 28 comprises CSI-RS, which are cell-specific reference signals that differ from one cell to another. In some embodiments, CoMP mode identification module 52 identifies the current CoMP mode, as well as the currently-selected cell, by processing the CSI-RS. Additionally or alternatively, feedback calculation module 56 calculates the channel feedback for a given cell (referred to as CSI-RS resource) by processing the CSI-RS received from that cell. Typically, the UE calculates and sends feedback per CSI-RS resource. Cells 28 or scheduler 32 associate the CSI-RS resources with cells.

Figure 2:
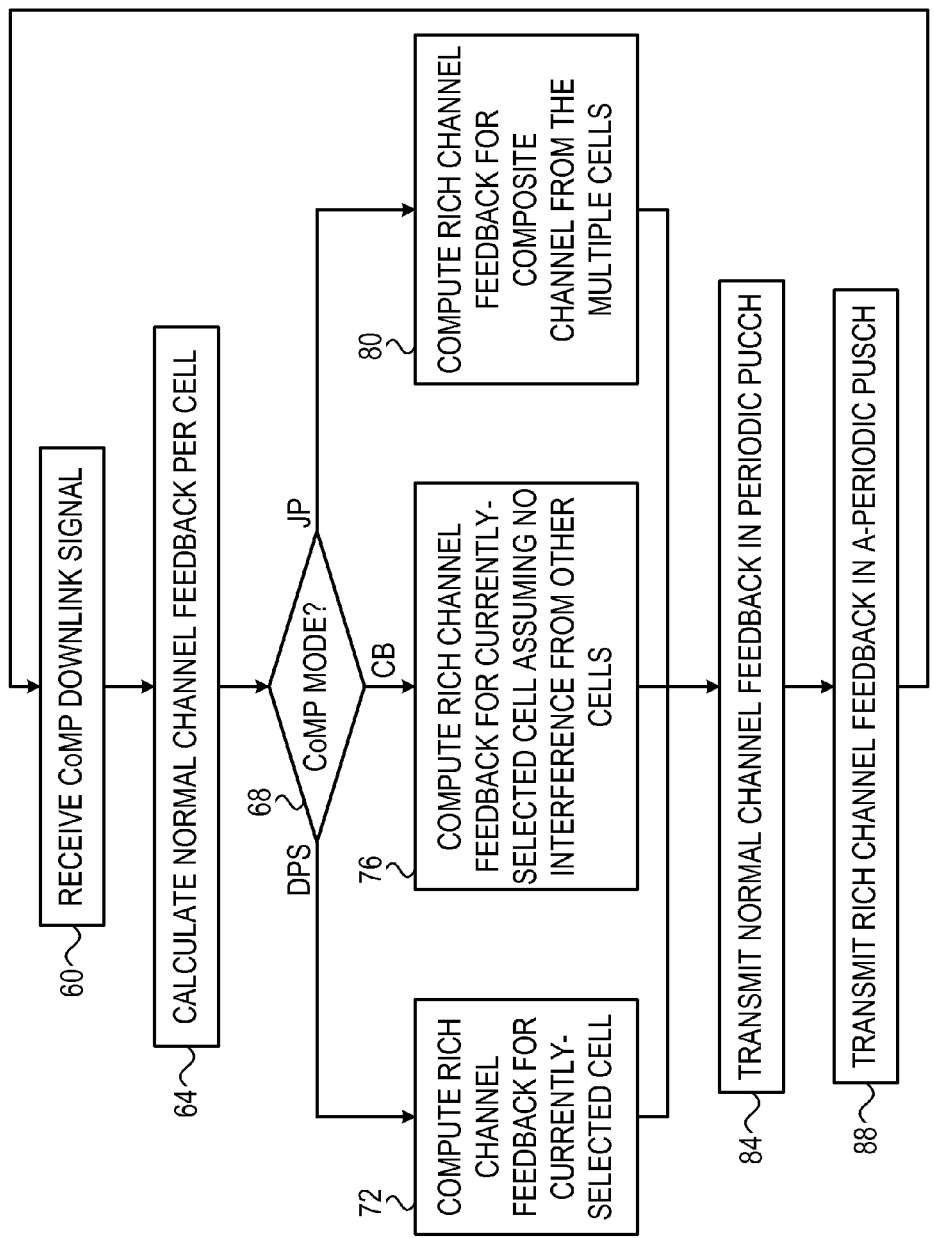
FIG. 2 is a flow chart that schematically illustrates a method for providing channel feedback in a MIMO communication system that uses CoMP, in accordance with an embodiment that is described herein.

FIG. 2 is a flow chart that schematically illustrates a method for providing channel feedback by UE 24 in system 20, in accordance with an embodiment that is described herein. The method begins with downlink receiver 40 of UE 24 receiving a CoMP downlink signal from cells 28, at a reception operation 60. Module 56 in the UE calculates the normal channel feedback separately for each of cells 28, at a normal feedback calculation operation 64.

Module 52 of UE 24 identifies (or hypothesizes) the currently-used CoMP mode, at a mode identification operation 68. If the current CoMP mode is DPS, module 56 computes the rich channel feedback only for the cell that is currently selected for transmitting to the UE, while considering interference from other cells, at a DPS rich feedback calculation operation 72.

If the current CoMP mode is CB, module 56 calculates the rich channel feedback only for the currently-selected cell, assuming no interference from other cells, at a CB rich feedback calculation operation 76. If the current CoMP mode is JP, module 56 calculates the rich channel feedback for the composite MIMO communication channel from all cells 28, at a JP rich feedback calculation operation 80.

Feedback calculation module 56 provides the normal channel feedback (one for each cell 28) and the single rich channel feedback to uplink transmitter 44 for transmission to the cells.

In some embodiments, transmitter 44 transmits the normal channel feedback in a periodic uplink control channel such as a Physical Uplink Control Channel (PUCCH), at a normal feedback transmission operation 84. The rich channel feedback, on the other hand, is transmitted by transmitter 44 in an a-periodic channel such as a Physical Uplink Shared Channel (PUSCH), at a rich feedback transmission operation 88. The method then loops back to operation 60 above.

The rationale behind transmitting the normal and rich channel feedback in the PUCCH and PUSCH, respectively, is as follows: The normal channel feedback is typically used by scheduler 32 for selecting the CoMP mode and/or to select the cell or cells that will transmit to UE 24. For these decisions, relatively coarse channel feedback is typically sufficient. On the other hand, at least in some CoMP modes (e.g., DPS and DPB) the normal channel feedback should be provided rapidly and periodically in order to enable frame-by-frame cell selection. Thus, a periodic control channel such as PUCCH is best suited for transmitting the normal channel feedback.

The rich channel feedback, on the other hand, in an embodiment is used by scheduler 32 for configuring the transmission from the selected cell or cells, e.g., for calculating precoding vectors. For this purpose, fine and accurate channel feedback is important, especially in CoMP modes such as JP. An a-periodic channel such as PUSCH is best suited to match these requirements in an embodiment.

In various embodiments, the per-cell normal channel feedback and the single rich channel feedback may comprise different parameters and may have different formats. U.S. Provisional Patent Application 61/568,588, cited above, includes examples of simulation results that help specifying the feedback parameters.

Simulation results indicate, for example, that DPS achieves best performance when only two cooperating cells are assigned to a UE. Thus, in an embodiment, a single bit is sufficient for signaling the dynamic selection of one of the cells to transmit to the UE. In an example embodiment, "0" indicates that the serving cell is selected, and "1" indicates otherwise.

In this embodiment, for DPS, the single rich channel feedback comprises a rank indicator for the selected cell, Precoding Matrix Indicator (PMI) and Channel Quality Indicator (CQI) per spectral sub-band for the selected cell, and a 1-bit indication that identifies the selected cell per sub-band.

Simulation results also indicate that DPS performance saturates when more than three cooperating cells are assigned to a UE. Therefore, in an embodiment, no more than two bits are needed for signaling the cell selection. Thus, in this embodiment, for DPS, the single rich channel feedback comprises a rank indicator for the selected cell, PMI/CQI per sub-band for the selected cell, and a 2-bit indication that identifies the selected cell per sub-band (or according to the feedback granularity—wideband or per sub-band).

In some embodiments, for DPS/DPB, the single rich channel feedback comprises an indication (denoted $i_1$) of the cell selected for blanking, an indication (denoted $i_2$) of the cell selected for transmission, a rank indicator for the cell selected for transmission, PMI for the cell selected for transmission, and CQI for the cell selected for transmission. In an example embodiment, two bits are allocated for $i_1$ and $i_2$, three bits are allocated for the rank indicator, and four bits are allocated for the PMI and CQI. In an alternative embodiment, a single bit is allocated for $i_1$ and $i_2$, three bits are allocated for the rank indicator, and four bits are allocated for the PMI and CQI.

The simulation results also indicate that two or four CSI-RS resources (two cooperating cells) are typically sufficient for JP and CB operation. In other words, a two-bit indicator is sufficient for selecting up to four CSI-RS resources. A one-bit bit indicator enables selection of two CSI-RS resources. Therefore, no more than four CSI-RS resources are typically needed for per UE for CoMP measurement, feedback and transmission.

The channel feedback contents and formats described above are presented by way of example. In alternative embodiments, the normal and rich channel feedback may comprise any other suitable content and format.

Although the embodiments described herein mainly address CoMP in LTE systems, the methods and systems described herein can also be used in other applications, such as in carrier aggregation in LTE, cooperation in other communication standards such as WiMAX and 3GPP2, among others.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for providing channel feedback within a system comprising (i) a mobile communication terminal and (ii) three or more cells, the method comprising:

receiving, in the mobile communication terminal, signals from multiple cells of the three or more cells that coordinate transmission of the signals with one another in a Dynamic Point Selection (DPS) Cooperative Multipoint (CoMP) scheme, wherein, in accordance with the DPS CoMP scheme, a single cell of the multiple cells is selected to transmit to the mobile communication terminal in a given time-frequency resource;

calculating in the terminal, based on the received signals, (i) a respective channel feedback for each of the multiple cells, and (ii) a single rich channel feedback, wherein the single rich channel feedback comprises, per spectral sub-band, only a single-bit indication that identifies the single cell selected to transmit to the mobile communication terminal, and wherein the single-bit indication is sufficient to identify the multiple cells of the three or more cells that cooperate in the DPS CoMP scheme; and transmitting the channel feedback for the multiple cells on a periodic uplink control channel, and transmitting the single rich channel feedback on an a-periodic uplink channel.

2. The method according to claim 1, wherein transmitting the channel feedback on the periodic uplink control channel comprises sending the channel feedback on a Physical Uplink Control Channel (PUCCH), and wherein transmitting the rich channel feedback on the a-periodic uplink channel comprises sending the rich channel feedback on a Physical Uplink Shared Channel (PUSCH).

3. The method according to claim 1, wherein calculating the rich channel feedback comprises assessing in the terminal a mode of cooperation used by the multiple cells to transmit the signals, and computing the rich channel feedback in accordance with the assessed mode of cooperation.

4. Apparatus, comprising:
- a receiver configured to receive signals from multiple cells of three or more cells that coordinate transmission of the signals with one another in a Dynamic Point Selection (DPS) Cooperative Multipoint (CoMP) scheme, wherein, in accordance with the DPS CoMP scheme, a single cell of the multiple cells is selected to transmit to the mobile communication terminal in a given time-frequency resource;
- processing circuitry configured to calculate, based on the received signals, a respective channel feedback for each of the multiple cells, and a single rich channel feedback, wherein the single rich channel feedback comprises, per spectral sub-band, only a single-bit indication that identifies the single cell selected to transmit to the mobile communication terminal, and wherein the single-bit indication is sufficient to identify the multiple cells of the three or more cells that cooperate in the DPS CoMP scheme; and
- a transmitter configured to transmit the channel feedback for the multiple cells on a periodic uplink control channel, and to transmit the single rich channel feedback on an a-periodic uplink channel.

5. The apparatus according to claim 4, wherein the transmitter is configured to transmit the channel feedback on a Physical Uplink Control Channel (PUCCH), and to transmit the rich channel feedback on a Physical Uplink Shared Channel (PUSCH).

6. The apparatus according to claim 4, wherein the processing circuitry is configured to assess a mode of cooperation used by the multiple cells to transmit the signals, and to compute the rich channel feedback in accordance with the assessed mode of cooperation.

7. A mobile communication terminal comprising the apparatus of claim 4.

8. A chipset for processing signals in a mobile communication terminal, comprising the apparatus of claim 4.

9. A method for a central scheduler to configure transmission from multiple cells to a mobile communication terminal within a system comprising (i) the mobile communication terminal and (ii) three or more cells, the method comprising:
- receiving, on a periodic uplink control channel, channel feedback from the mobile communication terminal, wherein the channel feedback comprises channel feedback for multiple cells of the three or more cells that coordinate transmission to the terminal in a Dynamic Point Selection (DPS) Cooperative Multipoint (CoMP) scheme, wherein, in accordance with the DPS CoMP scheme, a single cell of the multiple cells is selected to transmit to the mobile communication terminal in a given time-frequency resource;
- receiving, on an a-periodic uplink channel, a single rich channel feedback from the mobile communication terminal, wherein the single rich channel feedback comprises, per spectral sub-band, only a single-bit indication that identifies the single cell selected to transmit to the mobile communication terminal, and wherein the single-bit indication is sufficient to identify the multiple cells of the three or more cells that cooperate in the DPS CoMP scheme; and
- configuring, by the central scheduler, the transmission of the multiple cells to the terminal based on (i) the channel feedback and (ii) the single rich channel feedback.

10. The method according to claim 9, wherein configuring the transmission comprises selecting a mode of cooperation among the cells based on the channel feedback, and configuring the transmission in the selected mode of cooperation based on the single rich feedback.

11. A wireless communication network system, comprising:
- three or more cells, wherein multiple cells of the three or more cells are configured to coordinate transmission to a mobile communication terminal in a Dynamic Point Selection (DPS) Cooperative Multipoint (CoMP) scheme, wherein, in accordance with the DPS CoMP scheme, a single cell of the multiple cells is selected to transmit to the mobile communication terminal in a given time-frequency resource; and
- a central scheduler configured to
  - receive, from the mobile communication terminal via the cells, channel feedback for the multiple cells,
  - receive, from the mobile communication terminal via the cells, a single rich channel feedback, wherein the single rich channel feedback comprises, per spectral sub-band, only a single-bit indication that identifies the single cell selected to transmit to the mobile communication terminal, and wherein the single-bit indication is sufficient to identify the multiple cells of the three or more cells that cooperate in the DPS CoMP scheme, and
  - configure the transmission of the multiple cells to the terminal based on (i) the channel feedback and (ii) the single rich channel feedback.

12. The system according to claim 11, wherein the central scheduler is configured to select a mode of cooperation among the cells based on the channel feedback, and to configure the transmission of CoMP transmissions from the multiple cells to the terminal in the selected mode of cooperation based on the single rich feedback.

\* \* \* \* \*